United States Patent [19]

Miyawaki

[11] Patent Number: 4,656,892
[45] Date of Patent: Apr. 14, 1987

[54] CONTROL SYSTEM FOR AN INFINITELY VARIABLE TRANSMISSION

[75] Inventor: Motohisa Miyawaki, Chofu, Japan

[73] Assignee: Fuji Jukogyo Kabushiki Kaisha, Tokyo, Japan

[21] Appl. No.: 676,704

[22] Filed: Nov. 30, 1984

[30] Foreign Application Priority Data

Dec. 9, 1983 [JP] Japan .................................. 58-232934

[51] Int. Cl.[4] ........................ B60K 41/14; F16H 11/06
[52] U.S. Cl. ........................................... 74/868; 474/12
[58] Field of Search ............... 474/18, 28, 12; 74/868, 74/866, 867

[56] References Cited

U.S. PATENT DOCUMENTS

| 3,762,231 | 10/1973 | Pettigrew | 474/28 |
| 4,152,947 | 5/1979 | van Deursen et al. | 74/230.17 F |
| 4,387,608 | 6/1983 | Mohl et al. | 474/18 X |
| 4,400,164 | 8/1983 | Cadee | 474/18 X |
| 4,462,277 | 7/1984 | Miki et al. | 74/867 |

FOREIGN PATENT DOCUMENTS

| 0216904 | 8/1961 | Austria | 474/28 |
| 0193962 | 11/1983 | Japan | 474/28 |
| 2064686 | 6/1981 | United Kingdom | 474/18 |

Primary Examiner—Leslie Braun
Assistant Examiner—Martin G. Belisario
Attorney, Agent, or Firm—Martin A. Farber

[57] ABSTRACT

A control system for an infinitely variable belt-drive transmission for an engine comprises a primary pulley having a hydraulically shiftable disc, a secondary pulley having a hydraulically shiftable disc, a belt engaged with both pulleys, and a hydraulic circuit having a pump for supplying oil. A transmission ratio control valve is provided to be responsive to engine speed for controlling the oil and for shifting the disc of the primary pulley to change the transmission ratio, and a pressure regulator valve is provided to respond to the transmission ratio for controlling the line pressure in the hydraulic circuit. A piston is slidably mounted in the hydraulic cylinder of the primary pulley and a hydraulic circuit operated valve having a solenoid is provided to apply the line pressure to the hydraulic cylinder by the operation of the solenoid operated valve to shift the piston so as to restrict shifting of the disc of the primary pulley to the maximum transmission ratio position.

6 Claims, 3 Drawing Figures

CONTROL SYSTEM FOR AN INFINITELY VARIABLE TRANSMISSION

BACKGROUND OF THE INVENTION

The present invention relates to a system for controlling the transmission ratio of an infinitely variable belt-drive transmission for a vehicle. U.S. Pat. No. 4,152,947 discloses a control system for an infinitely variable transmission.

The infinitely variable belt-drive transmission comprises an endless belt running over a primary pulley and a secondary pulley. Each pulley comprises a movable conical disc which is axially moved by a fluid operated servo device so as to vary the running diameter of the belt on the pulley depending on driving conditions. The system is provided with an oil pressure regulator valve and a transmission ratio control valve. Each valve comprises a spool to control the oil pressure by shifting the spool.

The primary pulley has a Pitot pressure generating device for producing Pitot pressure dependent on engine speed. The Pitot pressure is applied to one axial end of the spool of each valve to urge the spool. On the other hand, the actual transmission ratio is detected by the axial position of the movable conical disc of the primary pulley which represents the running diameter of the belt on the primary pulley. The position of the movable conical disc is transmitted to the other axial end of the spool of the pressure regulator valve by a rod and a link.

The spool of the transmission ratio control valve is shifted in dependency on the opening degree of a throttle valve of an engine and on the engine speed (Pitot pressure) to control the amount of oil to be supplied to the servo device of the primary pulley so as to control the transmission ratio. The spool of the oil pressure regulator valve is shifted in dependency on the engine speed and on the transmission ratio to regulate the line pressure of the oil. Thus, the transmission ratio can be smoothly and infinitely varied.

In such a system, when starting a vehicle provided with the transmission, the transmission ratio is decided to be a predetermined maximum value and the value can not be changed in accordance with the starting conditions, for example under a heavy load or light load condition such as starting on a downhill. Accordingly, the transmission is inevitably upshifted from the maximum ratio when starting the vehicle and downshifted to the maximum ratio at deceleration regardless of the conditions of load. This results in a decrease of driveability and an increase of fuel consumption.

SUMMARY OF THE INVENTION

The object of the present invention is to provide a control system in which a maximum transmission ratio when starting and decelerating a vehicle can be changed in accordance with conditions of the vehicle.

The other objects and features of this invention will be apparently understood from the following description with reference to the accompanying drawings.

DETAILED DESCRIPTION OF THE PREFERRED EMBODIMENT

Figure 1:
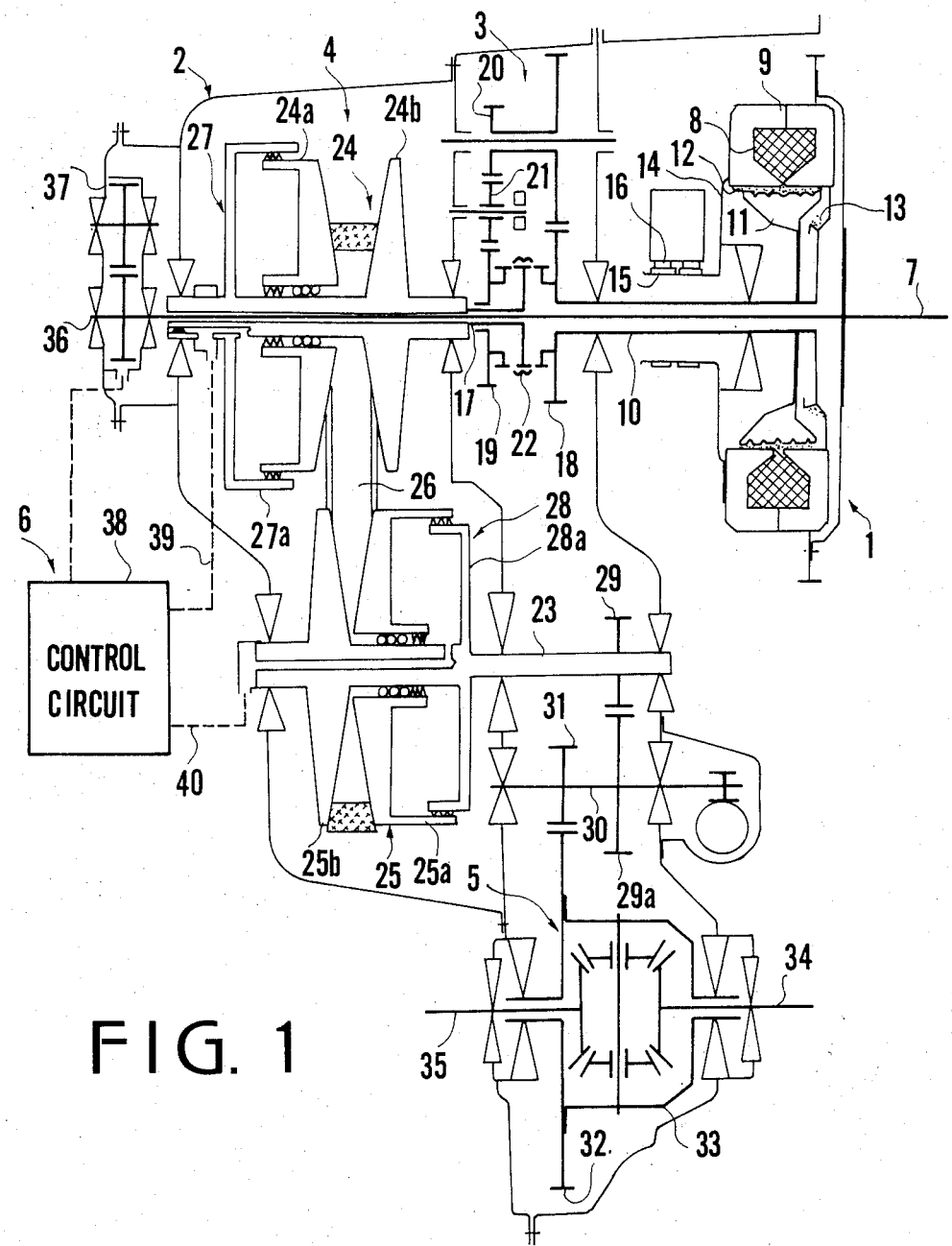
FIG. 1 is a schematic illustration of an infinitely variable belt-drive transmission.

Referring to FIG. 1, the infinitely variable belt-drive automatic transmission for a vehicle to which the present invention is applied, comprises an electromagnetic powder clutch 1, an infinitely variable belt-drive transmission 2, a selector mechanism 3, pulleys and belt device 4, final reduction device 5, and an oil control circuit 6. The crankshaft 7 of an engine (not shown) is connected to an annular drive member 9 of the electromagnetic powder clutch 1. The electromagnetic powder clutch comprises a coil 8 provided in the drive member 9, a driven member 11 having its outer periphery spaced from the inner periphery of the drive member 9 by a gap 12, and a powder chamber 13 defined between the drive member 9 and driven member 11. The powder chamber 13 is filled with powdered magnetic material. The driven member 11 is secured to an input shaft 10 of the belt-drive transmission. A holder 14 secured to the drive member 9 carries slip rings 15 which are electrically connected to the coil 8. The coil 8 is supplied through brushes 16 and the slip rings 15 with control current from an electronic control circuit.

When the magnetizing coil 8 is excited by clutch current, drive member 9 is magnetized to produce a magnetic flux passing through the driven member 11. The magnetic powder is aggregated in the gap 12 by the magnetic flux and the driven member 11 is engaged with the drive member 9 by the powder. On the other hand, when the clutch current is cut off, the drive and driven members 9 and 11 are disengaged from one another.

In the belt-drive transmission 2, the selector device 3 is provided between the input shaft 10 and a main shaft 17. The main shaft 17 is cylindrical and is disposed coaxially with the input shaft 10. The selector device 3 comprises a drive gear 18 integral with input shaft 10, reverse driven gear 19 rotatably mounted on the main shaft 17, and a synchronizer 22 mounted on the main shaft 17. The drive gear 18 meshes with one of the gears of a counter gear assembly 20. Another gear of the counter gear assembly 20 engages with an idler gear 21, which in turn engages with the driven gear 19.

The synchronizer 22 has a well known mechanism and comprises a hub secured to the main shaft 17, and a synchronizer sleeve slidably engaged to the hub with splines. The synchronizer sleeve is adapted to engage with splines of the drive gear 18 or with splines of the driven gear 19.

At a neutral position (N range) of a selector lever (not shown), the synchronizer 22 does not engage either gear, so that the main shaft 17 is disconnected from the input shaft 10. When the synchronizer is engaged with the gear 18, the input shaft 10 is connected to the main shaft 17 through the synchronizer to provide a driving position (D range).

When the synchronizer is engaged with the gear 19, the input shaft 10 is connected to the main shaft 17 through the gears 18, 20, 21 and 19 to provide a reverse driving position (R range).

The main shaft 17 has an axial passage in which an oil pump driving shaft 36 connected to the crankshaft 7 is mounted. An output shaft 23 is provided in parallel with the main shaft 17. A primary pulley 24 and a secondary pulley 25 are mounted on the shafts 17 and 23 respectively. A fixed conical disc 24b of the primary pulley 24 is integral with the main shaft 17 and an axially movable conical disc 24a is axially slidably mounted on the main shaft 17. The movable conical disc 24a also slides in a cylinder 27a formed on the main shaft 17 to provide a servo device 27. A chamber of the servo device 27 communicates with an oil pump 37 through a passage 39 and a control circuit 38. The oil pump 37 is driven by the shaft 36.

A fixed conical disc 25b of the secondary pulley 25 is formed on the output shaft 23 opposite the movable disc 24a and a movable conical disc 25a is slidably mounted on the shaft 23 opposite disc 24b. Movable conical disc 25a has a cylindrical portion in which a piston portion 28a of the output shaft 23 is slidably engaged to form a servo device 28. A chamber of the servo device 28 is communicated with the oil pump 37 through a passage 40 and the control circuit 38. A drive belt 26 engages with the primary pulley 24 and the secondary pulley 25.

Secured to the output shaft 23 is a drive gear 29 which engages with an intermediate reduction gear 29a on an intermediate shaft 30. An intermediate gear 31 on the shaft 30 engages with a final gear 32. Rotation of the final gear 32 is transmitted to axles 34 and 35 of driving wheels of the vehicle through a differential 33.

The pressure oil control circuit 38 is responsive to engine speed and throttle valve position for controlling the oil supply to the servo devices 27 and 28 thereby moving discs 24a and 25a. Thus, the transmission ratio is infinitely changed.

Figure 2:
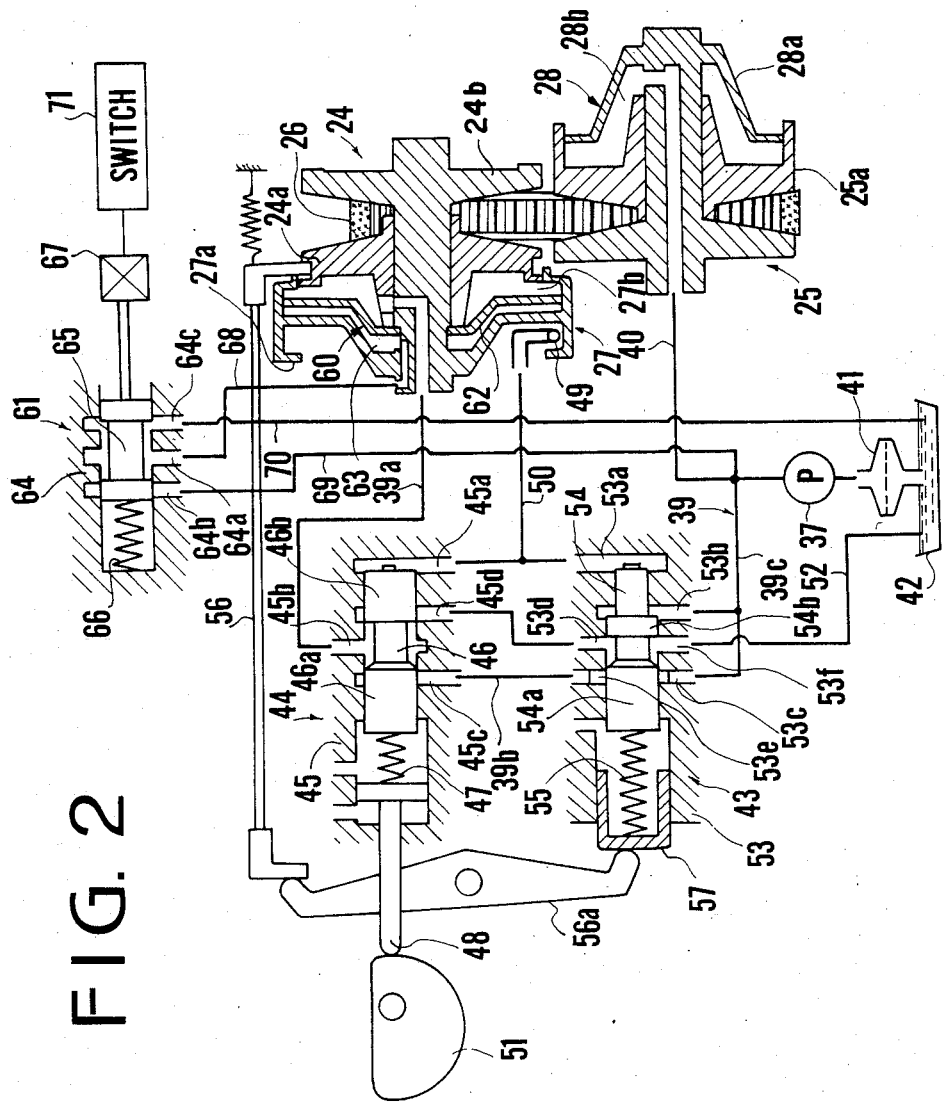
FIG. 2 is a schematic diagram showing a control system according to the present invention.

Referring to FIG. 2, a chamber 27b of servo device 27 is applied with pressurized oil by the oil pump 37 from an oil reservoir 42 passing through a filter 41, conduit 39, pressure regulator valve 43 and transmission ratio control valve 44. A chamber 28b of servo device 28 is supplied with pressurized oil through conduit 40 without passing through valves 43 and 44. The movable conical disc 24a of the primary pulley 24 is so designed that a pressure receiving area thereof is larger than that of movable conical disc 25a of the secondary pulley 25.

The transmission ratio control valve 44 comprises a valve body 45, spool 46, spring 47 for urging the spool in the downshift direction, an actuating member 48 for the spool 46 and the spring 47. The actuating member 48 engages a shift cam 51. The shift cam 51 is operatively connected to an accelerator pedal of the vehicle so as to be rotated in dependency on the magnitude of depression of the pedal. A port 45b of the valve 44 is selectively communicated with a pressure oil supply port 45c or a drain port 45d in accordance with the position of lands 46a and 46b of spool 46. Port 45b communicates with chamber 27b through a conduit 39a, and port 45c communicates with pressure regulator valve 43 through a conduit 39b. The drain port 45d communicates with the oil reservoir 42 through ports 53d and 53f and a conduit 52. An end chamber 45a of the transmission ratio control valve 44 is applied with Pitot pressure from a Pitot pipe 49 provided in the primary pulley 24 through a passage 50.

Thus, the spool 46 is shifted in dependency on the Pitot pressure dependent on the engine speed and on the pressure by the spring 47 dependent on the magnitude of depression of the accelerator pedal. The amount of oil supplied to the chamber 27b increases with an increase of engine speed to provide the upshift of the transmission.

The pressure regulator valve 43 comprises a valve body 53, spool 54, and a spring 55 for urging the spool 54 in one direction. A land 54b of the spool 54 is applied with pressure of the pressure oil supplied through conduit 39 and a port 53b, so that the spool 54 is moved to the left by the oil pressure at the port 53b. The other end of the spring 55 engages with a slidable spring retainer 57 which is moved through an arm 56a and rod 56. The rod 56 engages the disc 24a of the primary pulley 24 for detecting the transmission ratio during operation. A port 53c connected with the conduit 39c is communicated with a conduit 39b through an annular groove 53e and communicated with the port 53f in accordance with the position of a land 54a.

A first end chamber 53a of the pressure regulator valve 43 is applied with Pitot pressure from the Pitot pipe 49 through the passage 50. Accordingly, the spool 54 is applied with the Pitot pressure, with the pressure applied to the chamber 28b, and with the pressure of the spring 55 dependent on the transmission ratio. When the engine speed increases, the Pitot pressure increases. Thus, the spool 54 is shifted to the left to communicate the port 53c with the drain port 53f, so that the line pressure decreases. On the other hand, as the transmission ratio increases, the rod 56 moves to the left to rotate the arm 56a in the counterclockwise direction. Thus, the spool 54 is shifted to the right, so that the line pressure is increased. Accordingly, the belt 26 is always held by proper pressure of the movable discs 24a and 25a in accordance with the transmission ratio.

In accordance with the present invention, a maximum transmission ratio changing device 60 is provided in the chamber 27b of the servo device 27. The device 60 comprises a piston 62 axially slidably mounted in the chamber 27b. The piston 62 defines a piston chamber 63 and has a pressure receiving area on the side facing the chamber which is larger than the pressure receiving area of the movable disc 25a. The chamber 63 is applied with the line pressure through a conduit 68 communicated with a port of a solenoid operated valve 61. The solenoid operated valve 61 comprises a valve body 64, spool 65, return spring 66, port 64a, line pressure port 64b, drain port 64c, and solenoid 67 for shifting the spool 65. The port 64a is communicated with chamber 63 through conduit 68, port 64b is communicated with the conduit 39c through a conduit 69, and drain port 64c is communicated with the reservoir 42 through a conduit 70. The solenoid 67 is energized by operating a transmission ratio change switch 71.

Figure 3:
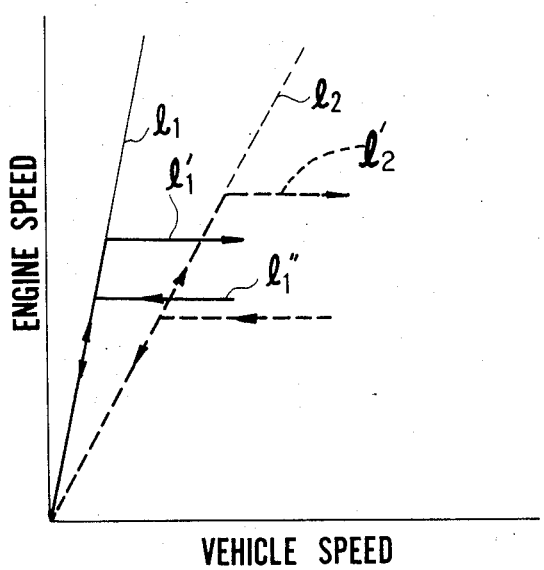
FIG. 3 is a graph showing transmission characteristics in the system of FIG. 2.

In operation, when the switch 71 is not operated, the solenoid 67 is not energized, so that the line pressure port 64b is closed by a land of the spool 65 and the port 64a is communicated with the drain port 64c. Accordingly, the piston 62 is moved to the left, thereby to free the movable disc 24a. Thus, the movable disc 24a is moved to the leftmost position to provide a maximum transmission ratio shown by a line $l_1$ in FIG. 3. Accordingly, when the vehicle is started, the transmission ratio is set at the value of the line $l_1$ and upshifted as shown by a line $l_1'$ in accordance with increasing engine speed and vehicle speed, and downshifted along a line $l_1''$.

When the switch 71 is operated, the solenoid 67 is energized to shift the spool 65 to the left to communicate the ports 64b and 64a with each other. Thus, line pressure is applied to the piston chamber 63 to move the piston to the right. Accordingly, the movement of the disc 24a to the left is restricted to an extent. Since the pressure receiving area of the piston 62 is larger than the disc 25a, the piston 62 is surely positioned to restrict the shifting of the disc 24a. Thus, the running diameter of the belt 26 on the pulley 24 becomes large to provide a lower transmission ratio as shown by a line $l_2$ in FIG. 3. Accordingly, the transmission ratio starts from the value $l_2$ when starting the vehicle and is upshifted along the $l'_2$.

Although, the change of the transmission ratio is performed by operating the switch 71, the change is automatically performed by detecting conditions of the vehicle.

From the foregoing, it will be understood that the present invention provides a control system which can change a maximum transmission ratio in accordance with conditions of a vehicle whereby driveability and fuel consumption may be improved.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system for an infinitely varible transmission for transmitting the power of an internal combustion engine mounted on a vehicle, the transmission comprising a primary pulley operatively connected to a crankshaft of the engine having a hydraulically shiftable disc and a first hydraulic cylinder for shifting the disc, a secondary pulley operatively connected to an output shaft and having a hydraulically shiftable disc and a second hydraulic cylinder for operating the disc of the secondary pulley, a belt engaged with both pulleys, a first hydraulic circuit having a pump for supplying oil, a transmission ratio control valve responsive to engine speed for controlling the oil so as to shift the disc of the primary pulley to change the transmission ratio, and a pressure regulator valve responsive to the transmission ratio for increasing line pressure of the hydraulic circuit with an increase of the transmission ratio, the improvement comprising:

means comprising a piston axially slidably mounted in the first hydraulic cylinder of the primary pulley defining a piston chamber in the first hydraulic cylinder, said means for restricting shifting of the disc of the primary pulley to a maximum transmission ratio of the transmission so as to limit movement of said disc of the primary pulley at a restricted position where the transmission ratio is lower than said maximum transmission ratio of the transmission;

a second hydraulic circuit provided between the pump and the piston chamber;

valve means in said second hydraulic circuit for controlling the oil supplied to the piston chamber; and means for operating the valve means for shifting the piston so as to provide said restricting of the shifting of the disc of the primary pulley to provide the lower transmission ratio.

2. The control system as set forth in claim 1 wherein said operating means operates the valve means responsive to predetermined vehicle conditions.

3. The control system as set forth in claim 1 wherein said first hydraulic cylinder is formed in one-piece with an immovable disc of said primary pulley, said shiftable disc of said primary pulley is axially slidably mounted in said first hydraulic cylinder.

4. The control system as set forth in claim 1 wherein said valve means is a solenoid operated valve and said operating means comprises a switch and a solenoid operatively connected to each other.

5. A control system for an infinitely variable transmission for transmitting the power of an internal combustion engine mounted on a vehicle, the transmission comprising a primary pulley operatively connected to a crankshaft of the engine having a hydraulically shiftable disc, comprising first means including a first hydraulic circuit for continuously operatively shifting said disc to a high transmission ratio position and a low transmission ratio position, second means independent of said first hydraulic circuit for preventing shifting of said disc into said high transmission ratio position so as to position said disc in a position of a transmission ratio lower than said high transmission ratio position, said second means is a piston which is fixable in position so as to abut said disc for preventing said shifting of said disc into said high transmission ratio position.

6. The control system as set forth in claim 5 wherein said piston is displaceable relative to said disc.

* * * * *